United States Patent Office 3,218,346
Patented Nov. 16, 1965

3,218,346
HALOALKYL TETRAHALOPHENYL
CARBONATES
Joseph Willard Baker, Kirkwood, and Raymond Eugene Stenseth, Webster Groves, Mo., assignors to Monsanto Company, a corporation of Delaware
No Drawing. Filed May 8, 1963, Ser. No. 279,020
8 Claims. (Cl. 260—463)

This invention relates to a novel class of haloalkyl tetrahalophenyl carbonates. More particularly, this invention is concerned with a class of new organic compounds which are chloro or bromoalkyl tetrahalophenyl carbonates. Such carbonates are found to possess useful and unexpected biological activity.

The novel compounds of this invention have the general formula,

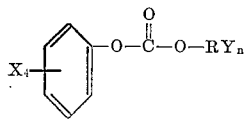

where X is selected from a group consisting of chlorine and bromine, $n$ is an integer from 1 to 3, R is alkyl containing from 2 to 4 carbon atoms, and Y is selected from a group consisting of chlorine and bromine.

As illustrative of RY, but not limitative thereof, are 2-chloroethyl, 2-chloropropyl, 3-chloropropyl, 2-chlorobutyl, 3-chlorobutyl, 4-chlorobutyl, 2-bromoethyl, 2-bromopropyl, 3-bromopropyl, 2-bromobutyl, 3-bromobutyl, 4-bromobutyl, 2,3-dichloropropyl, 2,3-dibromobutyl, 2,2,2-trichloroethyl, etc., and the various chloro and bromo substituted alkyl isomers containing from 2 to 4 carbon atoms.

This novel class of compounds can be prepared by causing a haloalkyl chloroformate to react with a tetrahalophenol to produce the desired chloroalkyl or bromoalkyl tetrahalophenyl carbonate. In such reactions, it is preferred to add a tertiary amine to the reaction mixture to serve as an acceptor for the hydrogen chloride formed during the reaction. Examples of tertiary amines which can be used are quinaldine, triethylamine, dimethylaniline, diethylaniline, pyridine, and the like. An exemplary reaction utilizing an amine acceptor yielding a desired tetrahalophenyl carbonate is as follows:

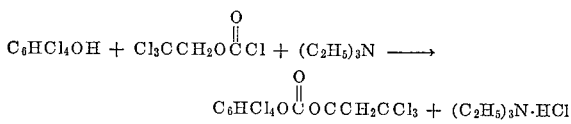

In practicing such preparations, it is also preferred to use an inert organic solvent for the chloroformate. Among the suitable solvents are benzene, toluene, xylene, hexane, heptane, octane, propyl ether, ethyl ether, tetrahydrofuran, dioxane, and the like. The reaction temperatures employed in preparing the new compounds will depend upon the particular reactants utilized to obtain a desired end product.

It should be noted that, although both are preferred, neither the tertiary amine nor the inert organic solvent is essential to the preparation of the compounds of this invention. In the absence of such amine, the hydrogen chloride which forms during the reaction can be boiled off.

The invention will be more fully understood by reference to the following examples, which are set forth herein solely for the purpose of illustration and are not to be construed as limiting the scope of the present invention.

Example 1

A suitable reaction vessel is charged with 4.6 grams (0.02 mol) of 2,3,4,6-tetrachlorophenol in 100 ml. of toluene. There is then added 2.9 grams (0.02 mol) of 2-chloroethyl chloroformate. The resulting solution is stirred during the dropwise addition of 2.0 grams (0.02 mol) of triethylamine in 10 ml. of toluene, over a period of about 10 minutes. The mixture is stirred at 110° C. for 3 hours, cooled, filtered, and washed with toluene. The filtrate and combined washings are evaporated to remove the toluene. The residue is recrystallized from Skellysolve B (an essentially n-hexane solvent having a boiling range of 60–70° C.) to yield 4.7 grams of 2,3,4,6-tetrachlorophenyl 2-chloroethyl carbonate, M.P. 54–55° C. Analysis shows 52.4% chlorine as against a calculated value of 52.6% for $C_9H_5Cl_5O_3$.

Example 2

In a suitable reaction vessel, 20.5 grams (0.05 mol) of 2,3,5,6-tetrabromophenol is reacted with 7.8 grams (0.05 mol) of 3-chloropropyl chloroformate according to the procedure set forth in Example 1. There is obtained 2,3,5,6-tetrabromophenyl 3-chloropropyl carbonate in good yield.

Example 3

In a suitable reaction vessel, 11.6 grams (0.05 mol) of 2,3,4,6-tetrachlorophenol is reacted with 9.6 grams (0.05 mol) of 2,3-dichloropropyl chloroformate according to the procedure set forth in Example 1. There is obtained 2,3,4,6-tetrachlorophenyl 2,3-dichloropropyl carbonate in good yield.

Example 4

In a suitable reaction vessel, 11.6 grams (0.05 mol) of 2,3,4,5-tetrachlorophenol is reacted with 8.5 grams (0.05 mol) of 4-chlorobutyl chloroformate according to the procedure set forth in Example 1. There is obtained 2,3,4,5-tetrachlorophenyl 4-chlorobutyl carbonate in good yield.

Example 5

In a suitable reaction vessel, 11.6 grams (0.05 mol) of 2,3,4,6-tetrachlorophenol is reacted with 9.4 grams (0.05 mol) of 2-bromoethyl chloroformate according to the procedure set forth in Example 1. There is obtained 2,3,4,6-tetrachlorophenyl 2-bromoethyl carbonate in good yield.

Example 6

In a suitable reaction vessel, 11.6 grams (0.05 mol) of 2,3,5,6-tetrachlorophenol is reacted with 10.6 grams (0.05 mol) of 2,2,2-trichloroethyl chloroformate according to the procedure set forth in Example 1. There is obtained 2,3,5,6-tetrachlorophenyl 2,2,2-trichloroethyl carbonate in good yield.

The products of the present invention are useful as microbiocides adapted to be employed for the control of bacterial and fungal organisms. In a representative test, 2,3,4,6-tetrachlorophenyl 2-chloroethyl carbonate is active against Staphyloccus aureus at a dilution in excess of one part per ten thousand, and against Aspergillus niger at a dilution in excess of one part per one hundred thousand.

While this invention has been described with respect to certain specific embodiments, it is not so limited. It is to be understood that variations and modifications thereof may be made without departing from the spirit and scope of this invention.

The embodiments of the invention in which an exclusive property or privilege is claimed are defined as follows:

1. A compound of the formula

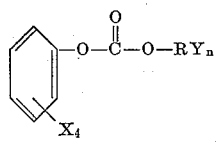

where X is selected from a group consisting of chlorine and bromine, $n$ is an integer from 1 to 3, R is alkyl containing from 2 to 4 carbon atoms, and Y is selected from a group consisting of chlorine and bromine.

2. A compound of the formula,

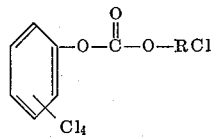

where R is alkyl containing from 2 to 4 carbon atoms.

3. A compound of the formula,

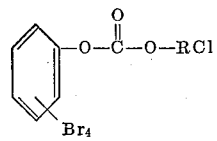

where R is alkyl containing from 2 to 4 carbon atoms.

4. A compound of the formula,

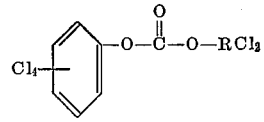

where R is alkyl containing from 2 to 4 carbon atoms.

5. A compound of the formula,

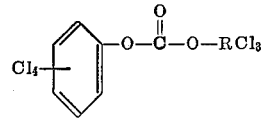

where R is alkyl containing from 2 to 4 carbon atoms.

6. 2,3,4,6-tetrachlorophenyl 2-chloroethyl carbonate.
7. 2,3,4,6-tetrachlorophenyl 2-bromoethyl carbonate.
8. 2,3,4,6-tetrabromophenyl 2-chloroethyl carbonate.

References Cited by the Examiner

UNITED STATES PATENTS

| | | | |
|---|---|---|---|
| 2,510,025 | 5/1950 | Moyle | 260—463 |
| 2,567,987 | 9/1951 | Baumgartner | 260—463 |
| 2,754,229 | 7/1956 | Fredenburg et al. | 260—463 X |
| 3,152,168 | 10/1964 | Fincke et al. | 260—463 |

OTHER REFERENCES

Beilstein, "Handbuch der Oganische Chemie," vol. 6, p. 196 (1923).

Beilstein, "Handbuch der Oganische Chemie," vol. 6, 1st addition, p. 88 (1931).

Melnikov, J. Prakt. Chem., vol. 128, pp. 233–238 (1930).

Newman et al., J.A.C.S., vol., 69, pp. 718–723 (1947).

CHARLES B. PARKER, *Primary Examiner.*